(12) United States Patent
Journade et al.

(10) Patent No.: US 7,971,826 B2
(45) Date of Patent: Jul. 5, 2011

(54) ENGINE ASSEMBLY FOR AN AIRCRAFT COMPRISING AN ENGINE AS WELL AS AN ENGINE MOUNTING STRUCTURE FOR SUCH AN ENGINE

(75) Inventors: Frederic Journade, Toulouse (FR); Robert Brunet, Fontenilles (FR)

(73) Assignee: Airbus Operations SAS, Toulouse (FR)

( * ) Notice: Subject to any disclaimer, the term of this patent is extended or adjusted under 35 U.S.C. 154(b) by 777 days.

(21) Appl. No.: 12/067,303

(22) PCT Filed: Sep. 26, 2006

(86) PCT No.: PCT/EP2006/066740
§ 371 (c)(1),
(2), (4) Date: Mar. 19, 2008

(87) PCT Pub. No.: WO2007/036522
PCT Pub. Date: Apr. 5, 2007

(65) Prior Publication Data
US 2008/0245926 A1 Oct. 9, 2008

(30) Foreign Application Priority Data
Sep. 28, 2005 (FR) ...................... 05 52930

(51) Int. Cl.
*B64D 27/00* (2006.01)
(52) U.S. Cl. .......................... 244/54; 244/55
(58) Field of Classification Search .............. 244/54, 244/55; 258/554, 555; 60/796
See application file for complete search history.

(56) References Cited

U.S. PATENT DOCUMENTS

| 3,893,638 | A | * | 7/1975 | Kelley | 244/12.5 |
| 5,524,847 | A | * | 6/1996 | Brodell et al. | 244/54 |
| 2008/0223983 | A1 | * | 9/2008 | Lafont et al. | 244/54 |
| 2008/0237394 | A1 | * | 10/2008 | Combes et al. | 244/54 |
| 2008/0272229 | A1 | * | 11/2008 | Lafont et al. | 244/54 |

FOREIGN PATENT DOCUMENTS

| EP | 0 469 825 | 2/1992 |
| EP | 0 517 459 | 12/1992 |
| EP | 0 743 434 | 11/1996 |
| EP | 1 018 468 | 7/2000 |
| EP | 1 266 826 | 12/2002 |
| EP | 1 365 203 | 11/2003 |
| GB | 2 302 371 | 1/1997 |

OTHER PUBLICATIONS

U.S. Appl. No. 12/601,355, filed Nov. 23, 2009, Journade, et al.
U.S. Appl. No. 12/066,565, filed Mar. 12, 2008, Journade, et al.
U.S. Appl. No. 12/918,500, filed Aug. 20, 2010, Journade, et al.
U.S. Appl. No. 12/918,334, filed Aug. 19, 2010, Journade, et al.
U.S. Appl. No. 12/918,530, filed Aug. 20, 2010, Journade, et al.

* cited by examiner

*Primary Examiner* — Tien Dinh
*Assistant Examiner* — Valentina Xavier
(74) *Attorney, Agent, or Firm* — Oblon, Spivak, McClelland, Maier & Neustadt, L.L.P.

(57) ABSTRACT

An aircraft engine assembly including an engine, an engine suspension pylon, and a heat exchanger system including an outlet located between the box and the engine, aft from the aft engine suspension. Furthermore, the outlet of the heat exchanger system is provided on an outlet pipe connected to the exchanger and passing through a structural block fixed on a box, between the box and the engine.

13 Claims, 6 Drawing Sheets

ENGINE ASSEMBLY FOR AN AIRCRAFT COMPRISING AN ENGINE AS WELL AS AN ENGINE MOUNTING STRUCTURE FOR SUCH AN ENGINE

TECHNICAL DOMAIN

This invention relates in general to the domain of engine suspension pylons designed to be inserted between an aircraft wing and an engine, and more particularly to an engine assembly comprising such a suspension pylon.

The invention may be used on any aircraft type, for example equipped with turbojets or turboprops.

This type of suspension pylon is also called an EMS (Engine Mounting Structure), for example that can be used to suspend a turboengine below the aircraft wing, or to fit this turboengine above this wing.

STATE OF PRIOR ART

Such a suspension pylon is designed to form an attachment interface between an engine such as a turbojet and an aircraft wing. It transmits forces generated by its associated turbojet to the structure of this aircraft, and it also enables routing of fuel, electrical, hydraulic and air systems between the engine and the aircraft.

The pylon comprises a rigid structure, also called the primary structure, frequently of the "box" type, in other words formed from the assembly of upper and lower spars and two lateral panels connected to each other through transverse ribs, to transmit forces.

The pylon is also provided with a mounting system inserted between the turbojet and the rigid structure of the pylon, this system globally comprising at least two engine suspensions, usually one forward suspension and one aft suspension.

Furthermore, the mounting system comprises a device for resisting thrusts generated by the engine. In prior art, this device, for example is in the form of two lateral connecting rods connected firstly to an aft part of the turbojet fan casing, and secondly to the aft engine suspension attached to the engine casing.

Similarly, the suspension pylon also comprises a second mounting system inserted between the rigid structure of this mounting system and the aircraft wing, this second system typically being composed of two or three suspensions.

Finally, the pylon is provided with a secondary structure for segregating and retaining systems while supporting aerodynamic fairings, in which the lower aft aerodynamic fairing usually projects from the trailing edge of the wing towards the aft direction.

Furthermore, the engine assembly is also provided with a heat exchanger system. When this heat exchanger is of the conventional type, in other words of the air/air type, it comprises an exchanger to which a hot air inlet, a cold air inlet, a first outlet that will be connected to an aircraft wing element, and a second outlet that will open up above the rigid structure of the pylon on the upstream side of the aft engine suspension, are connected. This particular arrangement of the second outlet has a number of disadvantages, for instance it is necessary to provide an outlet pipe passing vertically through the rigid structure of the pylon to bring the second outlet above the rigid structure, which creates obvious safety problems, and layout difficulties related to the poor access to the box forming the rigid structure.

Furthermore, with such an arrangement, the relatively hot air exits from the second outlet close to the aircraft wing, which can significantly disturb aerodynamic flow at the wing. Therefore, aircraft performances can be reduced by these disturbances.

Prior art also includes another type of engine assembly described in document EP-A-0 743 434 in which the second exchanger outlet opens up between the engine casing and an internal fairing of the cold air flow, close to the compressor unit. Nevertheless, the specific location of this second outlet near the forward end of the engine communicating with the exchanger cold air inlet makes it impossible to optimise use of fluid output from this second outlet.

SUMMARY OF THE INVENTION

Therefore, the purpose of the invention is to propose an aircraft engine assembly that at least partially overcomes the disadvantages mentioned above related to embodiments according to prior art and also to present an aircraft with at least one such engine assembly.

The invention achieves this in that its purpose is an aircraft engine assembly comprising an engine and an engine suspension pylon, this pylon comprising firstly a rigid structure, also called the primary structure, comprising a box provided with a lower structural element such as a lower spar, and secondly a mounting system inserted between the engine and the rigid structure, this mounting system particularly including an aft engine suspension, the assembly also being provided with a heat exchanger system, comprising an exchanger to which a hot fluid inlet, a cold air inlet, a first outlet for example that will be connected to a wing element of the aircraft when the heat exchanger is of the air/air type, and an least one second outlet, are connected. The first outlet communicates with the hot fluid inlet, and said at least one second outlet communicates with the cold air inlet. According to the invention, each second outlet from the heat exchanger system is located between the box and the engine, and therefore preferably below the lower spar type lower structural element when the engine is to be suspended under the aircraft wing, each second outlet being arranged aft from the aft engine suspension. Furthermore, the rigid structure of the suspension pylon also comprises a structural block fixed on the box between the box and the engine, this structural block being provided with an attachment interface for the aft engine suspension, said second outlet from the heat exchanger system being provided on a second outlet pipe connected to the exchanger and passing through the above-mentioned structural block.

Thus, this arrangement according to the invention advantageously does not -require a second outlet pipe passing through the box of the rigid structure of the pylon, because the second air outlet is below the lower structural element of this box, as is also the case for the exchanger when the engine is designed to be suspended under the wing. Consequently, the safety of the engine assembly and the ease of assembly of the heat exchanger system are improved. Furthermore, the position of the second outlet specific to this invention advantageously implies that air output from this outlet no longer disturbs the flow at the wing. Therefore aircraft performances can be improved compared with performances encountered with embodiments according to prior art.

Therefore, it should also be understood that the second outlet opens up beyond the aft engine suspension at a level at which the pressures are significantly higher than pressures on the upstream side of this engine suspension. Consequently, the differential pressure obtained between the cold air inlet and the second outlet from the exchanger system is considerably greater than the differential pressure encountered previously due to the strong suction that occurs at this second outlet, that significantly increases the air flow passing through the exchanger system, and therefore increases its performances.

Furthermore, considering that the second outlet is aft from the aft engine suspension, it becomes easy to make this outlet open up in the engine jet, and similarly to use air extracted from this second outlet as an additional thrust generator.

Therefore, the pylon is also made such that the rigid structure of the suspension pylon also comprises a structural block installed fixed on the box between the box and the engine, and preferably under the lower structural element of the box when the engine is designed to be suspended under the aircraft wing, this structural block then called the lower structural block having an attachment interface for the aft engine suspension.

Thus, in the non-limitative case in which the engine is designed to be suspended under the aircraft wing, this layout makes it globally possible to offset the aft engine suspension downwards from the box, due to the lower structural block therefore forming an integral part of the rigid structure and being comparable to a stem or a shoe. The addition of this block not used in embodiments according to prior art in which the rigid structure was composed exclusively of the box has many advantages, including that this box can be moved further away from the engine suspended from the pylon. Consequently, the temperature conditions applied to the box are less severe than the conditions normally found in embodiments in which the attachment interface of the aft engine suspension was directly located on the lower spar type lower structural element. Therefore, this reduction in the thermal conditions makes it possible to consider the use of materials less sensitive to heat for manufacture of the rigid box, such as composite materials such as glass fibres and/or carbon fibres impregnated with resin. In such a case, there is advantageously a very large mass saving for the entire suspension pylon.

Furthermore, it also provides a means of dissociating the design of the structural block, essentially dictated by the need to transfer forces from the aft engine suspension, from the design of the box, mainly sized as a function of the wing interface that it supports. This special feature implies that the width of the block can be less than the width of the box, thus providing a considerable advantage in terms of aerodynamic performances, given that the narrow block is located in the secondary flow area, and no longer the lower part of the wider box. Aerodynamic disturbances at the aft engine suspension are thus much lower than those that occurred previously.

Furthermore, it should obviously be understood that the geometry of the box is no longer influenced by the need to move closer to the engine casing, because this function can be provided entirely by the added lower structural block fixed on this box. Consequently, the geometry of this box may be considerably simplified, together with its manufacturing, particularly by providing a plane lower box face from one end to the other of the rigid structure. Its mass is then reduced and is perfectly optimised, because the lower part of the box advantageously no longer needs a large width offset exclusively designed to move closer towards the engine casing.

Finally, it should be noted that the block projecting downwards from the box and only extending over a short longitudinal length of the rigid structure makes it easy to pass ducts or similar elements through this lower structural block. Therefore this possibility provided for pylon equipment facilitates access to the aft part of the rigid structure, which in prior art required to pass through the box to which access is relatively difficult. In particular, this feature is particularly useful for the heat exchanger system, for which the second outlet will be located on a second outlet pipe connected to the exchanger and passing through the structural block, this solution then forming a relatively simple way of bringing this second outlet on the downstream side of the aft engine suspension supported by this same block.

Preferably, the second outlet opens up at the outside wall of an aft aerodynamic fairing of the suspension pylon, this aft aerodynamic fairing being located entirely in the aft from the aft engine suspension.

This configuration is extremely beneficial from the aerodynamic point of view. The above-mentioned fairing, also called the <<shield>> or the <<Aft Pylon Fairing>> and normally projecting towards the aft direction from a trailing edge of the wing, is usually impacted by the engine jet, which creates a non-negligible drag usually creating a relatively significant penalty in terms of performance. Thus, the fact that this second outlet opens up at the outside wall of the fairing means that the fairing is surrounded by an air stream protecting it from the jet output from the engine. Consequently, the drag generated by the reduced impact of the hot jet on the lower aft fairing is much lower than the drag that occurred previously, which has beneficial results on the performance.

In this respect, in order to simultaneously increase the thrust generated by air output from the second outlet, to improve the performances of the heat exchanger system, and to increase the protection of the aft aerodynamic fairing against the impact of the engine jet, this second outlet is preferably positioned at a break/base drag of the fairing, so as to accentuate the negative pressure and therefore further increase the differential pressure.

One alternative to the above mentioned solution could be to arrange that the second outlet from the exchanger system opens up inside the aft aerodynamic fairing of the suspension pylon. In this case, it is possible to provide an air outlet opening up aft from this fairing to extract air, this opening possibly being coupled to a controllable mobile structure that, depending on its position, can modify the aerodynamic shape of said fairing. With such an arrangement in which the mobile structure is preferably placed across the opening, the control of the mobile structure can therefore reduce/increase intake of the air output from the opening provided on this fairing, depending on whether the fairing is in a configuration defining one or several offsets designed to create a base drag to generate a significant air intake, or in a configuration defining a practically continuous aerodynamic shape with no offset so as to provoke the least possible drag.

Alternately, and always in the case in which the second outlet from the exchanger system opens up inside the aft aerodynamic fairing, it is possible for the aft aerodynamic fairing to be provided with a controllable mobile structure comprising two lateral panels articulated at their forward ends on two corresponding lateral skins of the fairing, each of the panels then being designed to close/release an opening formed in its related lateral skin of the fairing.

Two second outlets could also be provided, one opening up at the outside wall of the aft aerodynamic fairing of the suspension pylon, and the other opening up inside this fairing, these two outputs then being used alternately or simultaneously for ejection of air.

Also preferably, the first outlet from the heat exchanger system is provided on a first outlet pipe connected to the exchanger and passing through the box of the rigid structure. This arrangement is quite suitable for the case in which the heat exchanger is of the air/air type, and the first outlet is designed to be connected to a wing element of the aircraft. Nevertheless, it should be noted that the invention also covers other cases in which the fluid passing through the heat exchanger system and output from the first outlet is intended for use by the engine, the engine pod or the rigid pylon structure, rather than the wing and/or the fuselage.

In this respect, it should also be noted that the fluid/air type heat exchanger system is such that fluid passing through the hot fluid intake and the first outlet is chosen from among the group composed of air, oil and fuel.

In general, the exchanger is located between the box and the engine, forward from the aft suspension.

Finally, it is preferable if each second outlet is located between the box and the engine, adjacent to an engine exhaust nozzle or on the downstream side of it.

Another purpose of the invention is an aircraft comprising at least one engine assembly like that described above.

Other advantages and characteristics of the invention will become clear by reading the non-limitative detailed description given below.

BRIEF DESCRIPTION OF THE DRAWINGS

This description will be made with reference to the appended figures wherein:

FIG. 7b shows a sectional view taken along line VII-VII in FIG. 7a.

DETAILED DESCRIPTION OF PREFERRED EMBODIMENTS

Figure 1:
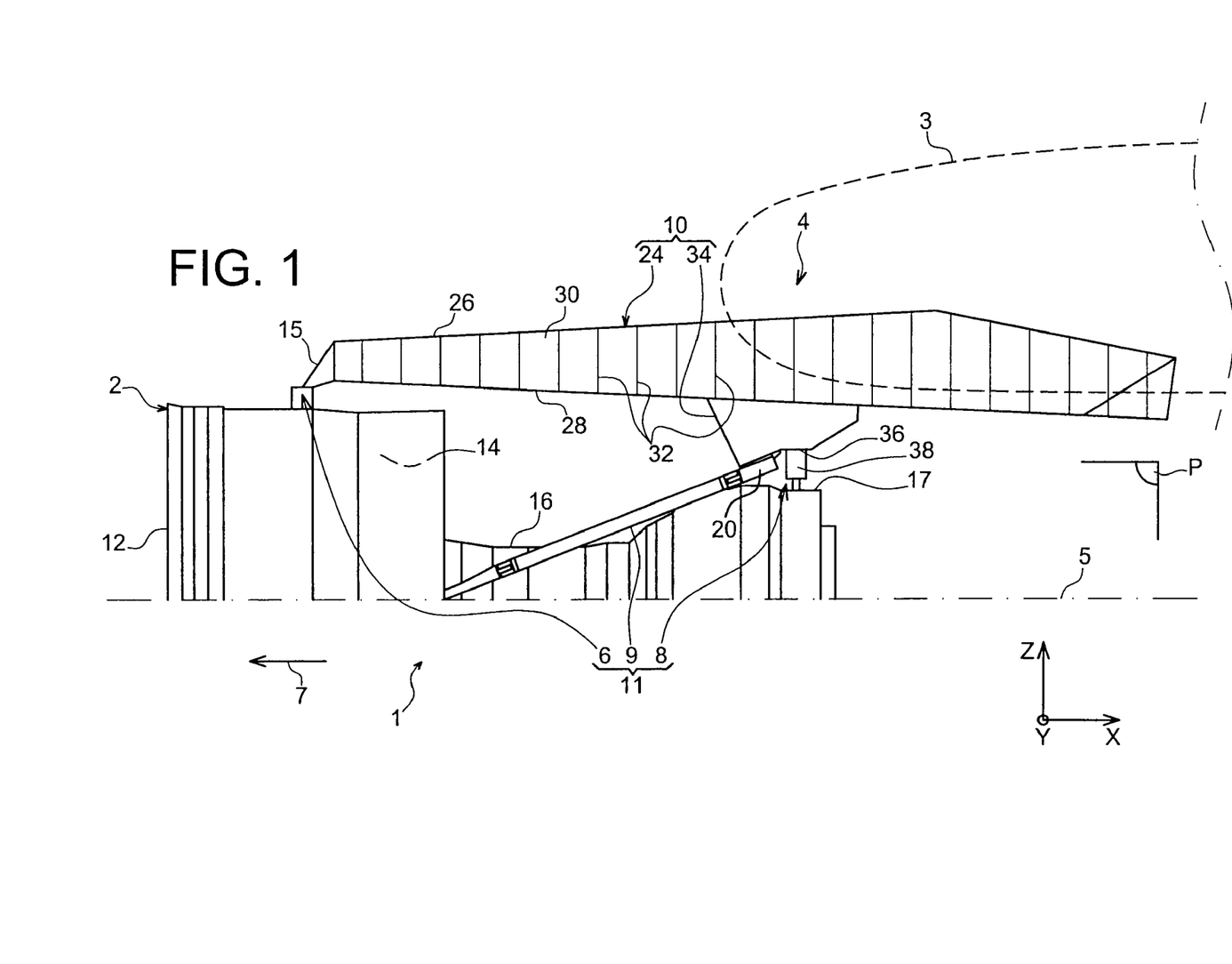
FIG. 1 shows a side view of an engine assembly for an aircraft according to a preferred embodiment of this invention, the heat exchanger system of the box having been deliberately omitted for reasons of clarity.

FIG. 1 shows an aircraft engine assembly 1 designed to be fixed under a wing 3 of this aircraft, this assembly 1 being provided with a suspension pylon 4, and in the form of a preferred embodiment of this invention.

Globally, the engine assembly 1 is composed of a turbojet 2 and the suspension pylon 4, the suspension pylon in particular being provided with a rigid structure 10 and a mounting system 11 composed of a plurality of engine suspensions 6, 8 and a device for resisting thrusts 9 generated by the turbojet 2, therefore the mounting system 11 being inserted between the engine and the above-mentioned rigid structure 10. For guidance, it should be noted that the assembly 1 is surrounded by a pod (not shown in this figure), and that the suspension pylon 4 comprises another series of suspensions (not shown) to assure suspension of this assembly 1 under the aircraft wing.

Throughout the following description, by convention, X refers to the longitudinal direction of the pylon 4 that is also considered to be the same as the longitudinal direction of the turbojet 2, this X direction being parallel to a longitudinal axis 5 of this turbojet 2. Furthermore, the direction transverse to the pylon 4 is called the Y direction and can also be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of motion of the aircraft that occurs as a result of the thrust applied by the turbojet 2, this direction being shown diagrammatically by the arrow 7.

In FIG. 1, it can be seen that only the force resistance device 9, the engine suspensions 6, 8 and the rigid structure 10 of the suspension pylon 4 are shown. The other constituents of this pylon 4 not shown, such as the suspension means of the rigid structure 10 under the aircraft wing, or the secondary structure controlling segregation and retention of systems while supporting aerodynamic fairings, are conventional elements identical or similar to those encountered in prior art or known to those skilled in the art. Consequently, no detailed description will be given of them, except for the lower aft aerodynamic fairing that may have a specific feature related to this invention.

The turbojet 2 is provided with a large dimension fan casing 12 at the forward end delimiting an annular fan duct 14 and comprises a smaller central casing 16 towards the aft and containing the core of this turbojet. Finally, the central casing 16 is prolonged towards the aft direction by an exhaust casing 17 larger than the casing 16. Obviously, the casings 12, 16 and 17 are fixed to each other.

As can be seen in FIG. 1, the plurality of engine suspensions is composed of a forward engine suspension 6 and an aft engine suspension 8, possibly forming two aft half-suspensions as is known in prior art. The thrust resistance device 9 may for example be in the form of two lateral connecting rods (only one being visible in the figure because it is a side view), connected firstly to an aft part of the fan casing 12, and secondly to a spreader beam 20 itself mounted on the rigid structure 10.

The forward engine suspension 6, fixed to the fitting 15 of the rigid structure 10 and to the fan casing 12, is conventionally designed so that it can resist only forces generated by the turbojet 2 along the Y and Z directions, and therefore not forces applied along the X direction. For guidance, this forward suspension 6 preferably penetrates into a circumferential end portion of the fan casing 12.

The aft engine suspension 8 is globally inserted between the exhaust casing 17 and the rigid structure 10 of the pylon. As mentioned above, it is preferably designed so as to be able to resist forces generated by the turbojet 2 along the Y and Z directions, but not forces applied along the X direction.

Consequently, in this statically determinate mounting system 11, forces applied along the X direction are resisted by the device 9, and forces applied along the Y and Z directions are resisted jointly by the forward suspension 6 and the aft suspension 8.

Also, the moment applied about the X direction is resisted vertically by means of the suspension 8, the moment applied about the Y direction is resisted vertically by means of the aft suspension 8 in cooperation with the suspension 6, and the moment applied about the Z direction is resisted transversely by the suspension 8 in cooperation with the suspension 6.

Still with reference to FIG. 1, it can be seen that the structure 10 has firstly a box 24 extending from one end of this structure 10 to the other along the X direction, and therefore forms a torsion box called the main box of the structure. It is conventionally formed by an upper spar 26 and a lower spar 28, and by two lateral panels 30 (only one being visible in FIG. 1), both extending along the X direction and substantially in an XZ plane. Transverse ribs 32 inside this box arranged along the YZ planes and at a longitudinal spacing reinforce the stiffness of the box 24. It should be noted for guidance that the elements 26, 28 and 30 can each be made in a single piece, or by the assembly of adjacent sections, that may possibly be inclined slightly with respect to each other.

Preferably, as clearly shown in FIG. 1, the lower spar 28 is plane over its entire length, this plane being approximately parallel to an XY plane or slightly inclined with respect to this plane.

If the engine is to be suspended under the wing, a structural block 34 called the lower structural block 34 due to its position under the box 24, will be fixed on the outer surface of the lower spar 28. Nevertheless, it should be noted that in a case not described but covered by this invention in which the engine 2 is installed above the wing 3, the structural block would then be fixed onto the upper spar 26 of the box.

The block 34 has an attachment interface 36 of the aft suspension 8, therefore this interface 36 being located below the plane in which the spar 28 is located, and preferably oriented along an XY plane. As will be described later, note that this attachment interface 36 is designed to cooperate with an attachment body of the aft engine suspension 8.

Consequently, this solution in which the width of the block 34 along the Y direction is less than the width of the box 24 makes it possible to offset the suspension 8 downwards below the box 24, and therefore to move the engine 2 further from the box.

Thermal stresses applied to the box 24 are thus relatively low, such that it becomes possible to make it from a composite material or from any other material sensitive to heat that could result in a mass saving for the entire pylon 4. On the other hand, the block 34 more exposed to these thermal stresses due to its proximity to the engine 2, may be made from a metallic material, preferably titanium.

Figure 2:
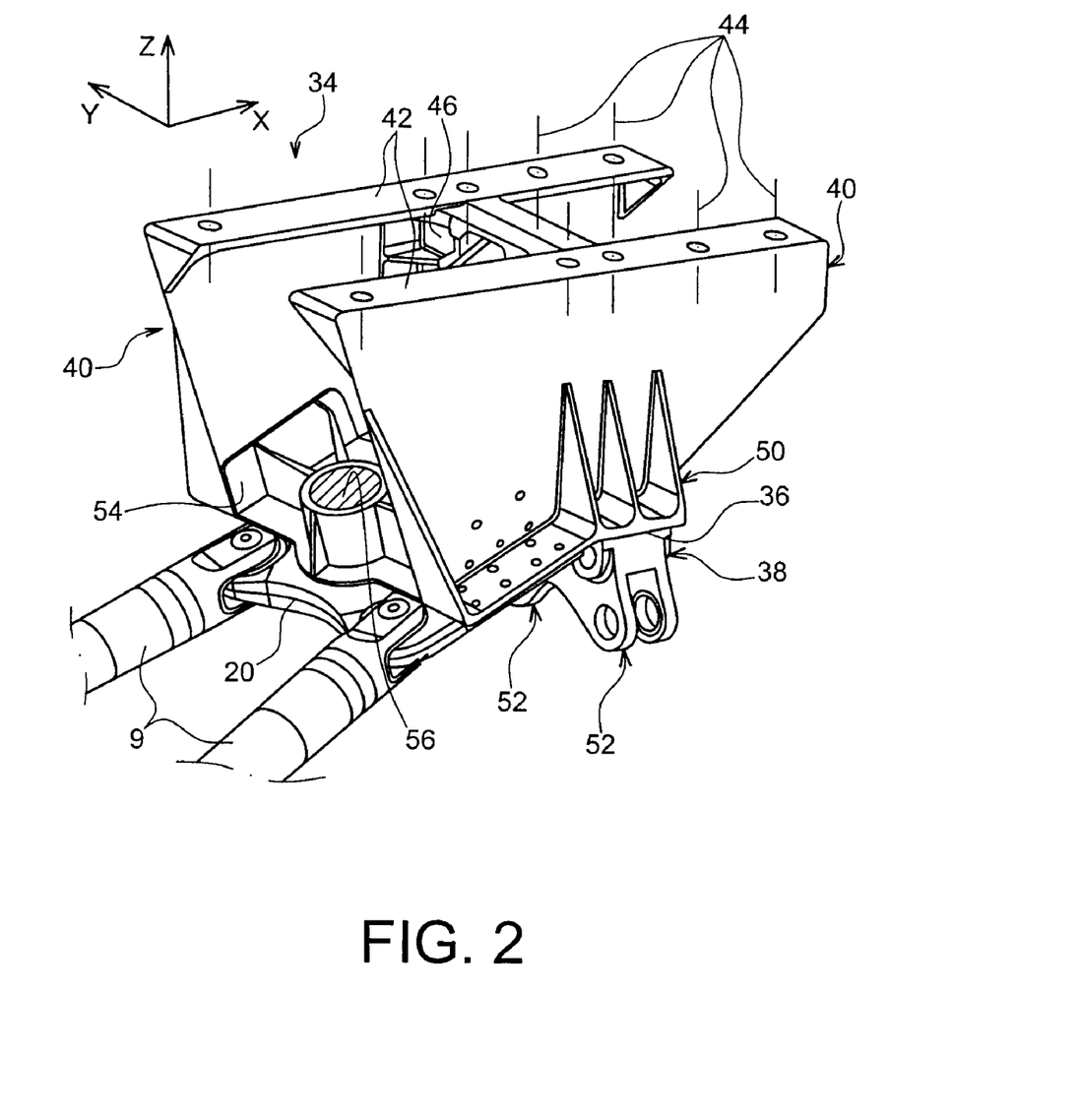
FIG. 2 shows an enlarged perspective view of the lower structural block belonging to the rigid structure of the suspension pylon of the engine assembly shown in FIG. 1.

Now with reference to FIG. 2, the figure shows that globally the structural block 34 fixed under the lower spar 28 has two sides 40, each equipped with an attachment rib 42 in the upper part oriented in the plane of this spar 28 so as to come into contact with it and to attach the block 34 onto the box 24. In this respect, this attachment is preferably made using a plurality of tension bolts and shear pins (not shown) arranged perpendicular to the lower spar 28 along axes 44 passing through the ribs 42. These attachment means can advantageously reduce the thermal conductivity between the block 34 and the lower spar 28, this conduction possibly being reduced even further by inserting insulating rings or washers between these two elements 24, 34.

Furthermore, the block 34 also comprises one or several transverse ribs 46 arranged between the two sides 40 and preferably oriented along the YZ planes.

The attachment interface 36 is defined by a lower portion 50 of the two sides 40, possibly in combination with one of the ribs 46 preferably in the form of a frame. Thus, this attachment interface 36 formed by the two lower portions 50 of the sides 40 and by the lower part of the rib 46 in question globally form a horizontal strip extending along the Y direction onto which the attachment body 38 of the aft engine suspension 8 is fixed, preferably by bolts.

This attachment body 38 is a known type and with design practically the same as that used earlier in embodiments in which this body was mounted directly onto the lower spar 28 of the box. Thus, this defines devises 52 on which shackles are articulated (not shown), also designed to be articulated onto fittings fixed to the engine.

Furthermore, an attachment fitting 54 of the spreader beam 20 is also arranged between the two sides 40, preferably forward from the attachment body 38. This fitting 54 then has a pivot 56 of the spreader beam 20, itself articulated at its two ends with the two thrust resistance rods 9.

Finally, note that this block 34 may be in the form of a secondary rigid box, and may include forward and aft closing plates (not shown) fixed to the sides 40, closing this box at the forward and aft ends.

Figure 3:
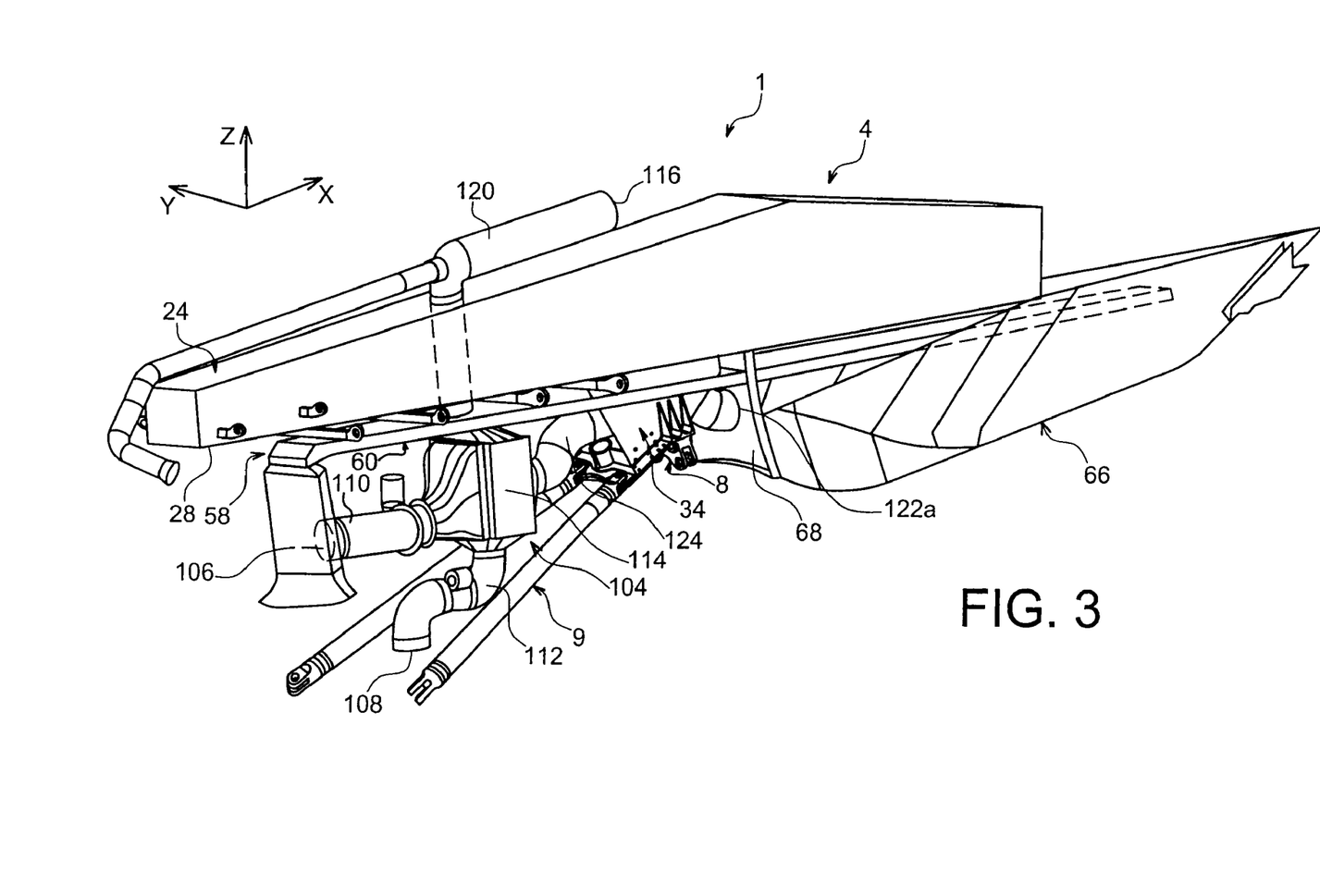
FIG. 3 shows a partial perspective view of the assembly in FIG. 1, showing the heat exchanger system.

FIG. 3 shows that the engine assembly 1 also comprises a heat exchanger system 104 that is composed globally of a cold air inlet 106 and a hot air inlet 108, the cold air inlet 106 preferably being arranged under the box 24, on the upstream side of a junction between a fan part and a thrust inversion part of the engine pod (not shown), and more precisely at the outlet from the annular fan duct so that it will intake cool air from this duct. The hot air inlet 108 is connected directly to the central casing of the engine 2 (not shown). The cold air inlet 106 and the hot air inlet 108 are provided at the forward end of a cold air pipe 110 and a hot air pipe 112 respectively, both of which are connected through their other ends to a heat exchanger 114 located between the box 24 and the engine 2 on the downstream side of the aft suspension 8 and the structural block 34. It should be noted that the exchanger 114 may use any design known to those skilled in the art.

Furthermore, the system 104 comprises a first outlet 116 designed to be connected to the wing, so as to perform de-icing, cabin air conditioning functions, etc. This outlet 116 is arranged at the end of a first outlet pipe 120, the other end of which is connected to the exchanger 114. In order to be able to join the wing, this pipe 120 is arranged to pass through the box 24, preferably vertically as can be seen in FIG. 3.

Finally, the exchanger system 104 is equipped with a second output 122a arranged at the end of a second outlet pipe 124, the other end of which is also connected to the heat exchanger 114. In this respect, note that the first output communicates with the hot air inlet and that the second output communicates with the cold air inlet.

FIG. 3 also shows a thermal protection system 58 for the box 24, globally comprising a preferably ventilated pipe 60 running under the lower spar 28. However, this thermal protection system 58 does not form part of this invention and consequently will not be described any further.

One of the special features of this invention is due to the fact that the second output 122a is on the aft side of the suspension 8, under the spar 28 of the box 24 in the case in which the engine is to be suspended under the aircraft wing. To achieve this, as can be seen in FIG. 3, this pipe 124 is made to cross the structural block 34 in the longitudinal direction, which is relatively easy in practice due to the short length of the block 34 along the X direction.

The same FIG. 3 shows one of the aerodynamic fairings installed on the pylon 4, which is known more specifically as the aft aerodynamic fairing or the lower aft aerodynamic fairing, or the shield or the Aft Pylon Fairing. This fairing 66, preferably arranged under the box 24, is entirely aft from the suspension 8 and usually projects in the aft direction towards the trailing edge of the wing 3. Therefore, it does not form part of the rigid structure of the pylon, but is connected to it by a support fitting 68 installed fixed under the box 24, in the aft direction from the block 34. Its lower forward part is approximately tangent to an upper part of the exhaust nozzle from engine 2, in a known manner.

In this preferred embodiment, the pipe 124 is such that it extends beyond the block 34 to penetrate inside the fairing 66 such that the second output 122a from this pipe is for example located close to a forward portion of the fairing 66. To achieve this, before penetrating into the fairing 66, the pipe 124 then passes through the fitting 68 supporting this same fairing. Thus, although it is not shown in FIG. 3, it is preferable to arrange that the second outlet 122a is facing the engine exhaust nozzle, or on the downstream side of it.

Figure 4:
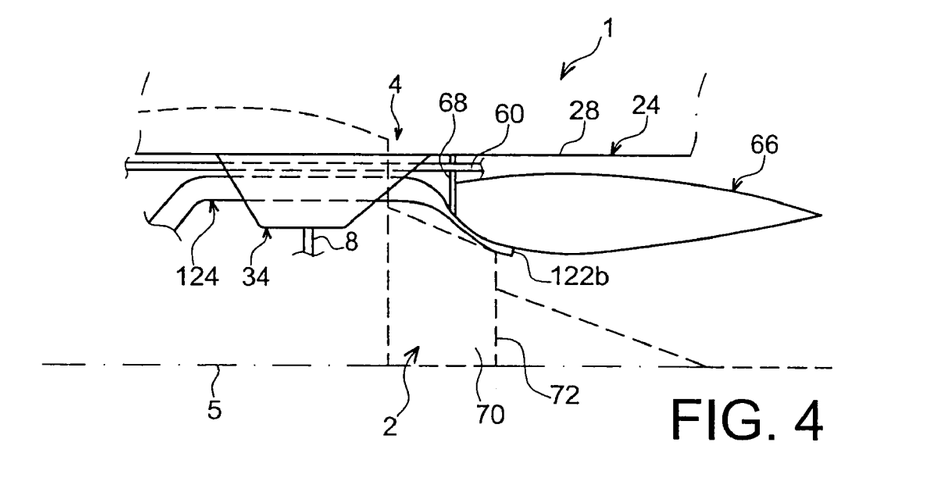
FIG. 4 shows a side view of an aircraft engine assembly, in the form of an alternative to the preferred embodiment shown in FIGS. 1 to 3.

FIG. 4 shows an alternative form of the preferred embodiment described above, showing that the second outlet pipe 124 does not enter inside the fairing 66, but is provided with a curvature or an elbow on the downstream side of the block 34 allowing it to run downwards along the support fitting 68.

Another elbow or another curvature is provided such that an end portion of this pipe 124 can be routed between the lower forward part of the fairing 66 and the upper part of the exhaust nozzle 70. Thus, it is arranged that the second outlet 122b opens up at the outside wall of the fairing 66, preferably on a side or lower part of it, and on the downstream side of an ejection end 72 of the nozzle 70. Furthermore, the second outlet 122b is preferably arranged at a break/offset (not shown) formed on the outside wall of the fairing 66, so as to create a base drag and therefore to accentuate the negative pressure of the air output from the pipe 124, which obviously contributes to obtaining a high differential pressure and increasing the performances of the heat exchanger system 104.

Note also that the special position of the second outlet 122b at the outside wall of the fairing 66 assures that the fairing is immersed in a air stream protecting it from the engine jet, which advantageously reduces the drag caused by the impact of the hot jet on this fairing 66.

Since the air extracted from the second outlet pipe 124 is advantageously used to generate thrust, the case described above in which the second outlet 122a opens up inside the fairing requires the presence of an air outlet opening on the fairing.

Figure 5A:
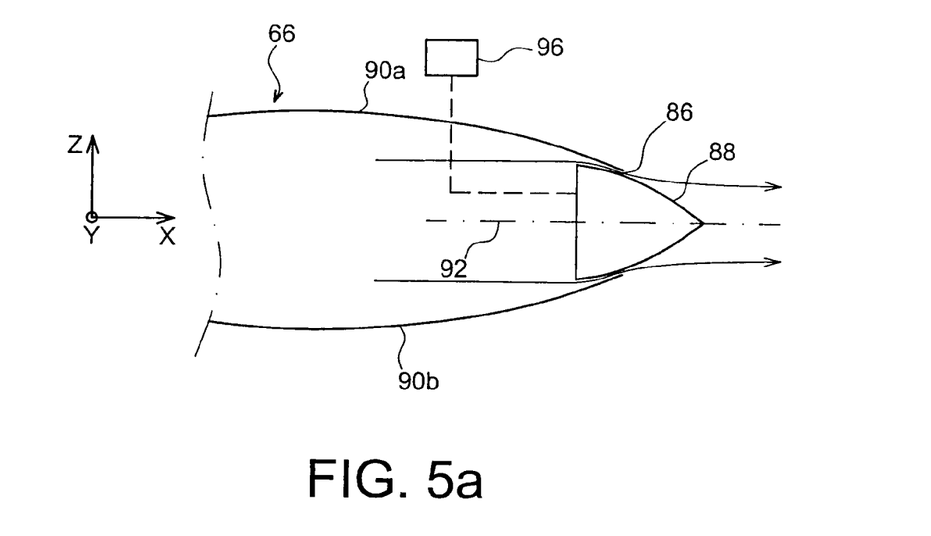
FIGS. 5a and 5b show top views of an aft portion of the aft aerodynamic fairing of the suspension pylon belonging to the assembly shown in FIG. 3, more specifically showing a controllable mobile structure capable of reducing/increasing the air intake at the outlet from the fairing.
Figure 5B:
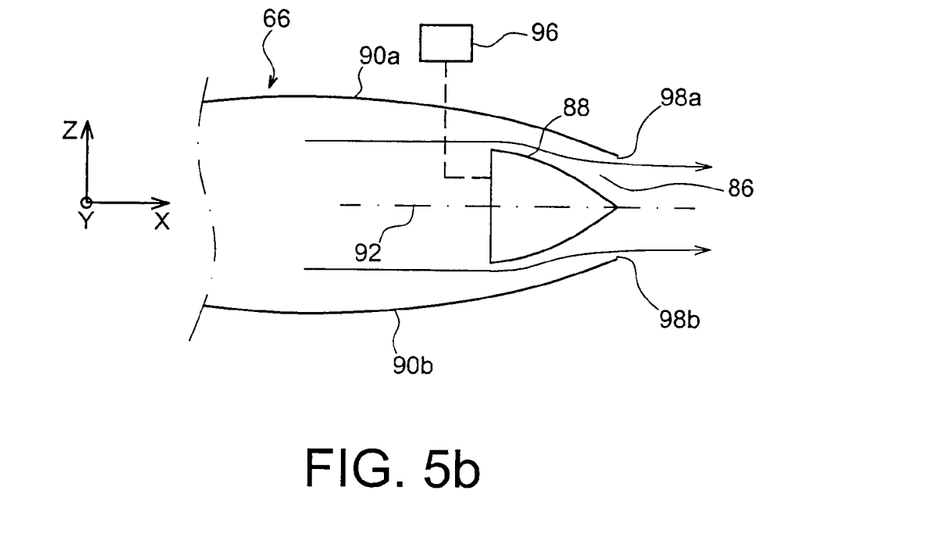

FIGS. 5a and 5b show a first way of making the aft portion of the aerodynamic fairing 66, which is then provided with said air outlet opening 86 in its aft end portion.

In this embodiment, it can be seen that the opening 86 is coupled to a controllable mobile structure 88 which, as a function of its position, can modify the aerodynamic shape of the fairing 66. This structure 88 is preferably in the form of an ogive or similar, which when it occupies an aft position also called a deployed aerodynamic position, projects from the opening 86 so as to approximately be in the aerodynamic extension of the lateral skins 90a, 90b of the fairing 66, as can be seen in FIG. 5a. This structure 88, that is controllable in translation along a direction 92 preferably approximately parallel to the X direction, for example through means 96 of actuating it and connected to it, makes it possible to obtain an approximately continuous aerodynamic shaped fairing 66 with no offset, that generates low drag. For guidance, this aerodynamic position will preferably be adopted during high speed phases of the aircraft.

FIG. 5b showing the mobile structure 88 in a forward position also called a retracted intake position, shows that this structure 88 is almost entirely retracted from the opening 86 that then has a larger cross section, which in particular implies that the aerodynamic extension of the lateral skins 90a, 90b of the fairing 66 is no longer assured. On the other hand, an offset or an aerodynamic rupture 98a, 98b appears at the aft end of each of these two skins 90a, 90b, which generates base drags caused by the air stream over the outer surface of these skins 90a, 90b. These base drags then increase intake of the air output from the opening 86, consequently increasing the efficiency of the protection system 58.

Consequently, this intake position will preferably be adopted during aircraft low speed phases. At low speed, the drag caused by offsets 98a, 98b is not severe, and the intake created by them can increase the differential pressure which, without the presence of these offsets, would be low due to the low aircraft speed.

Figure 6:
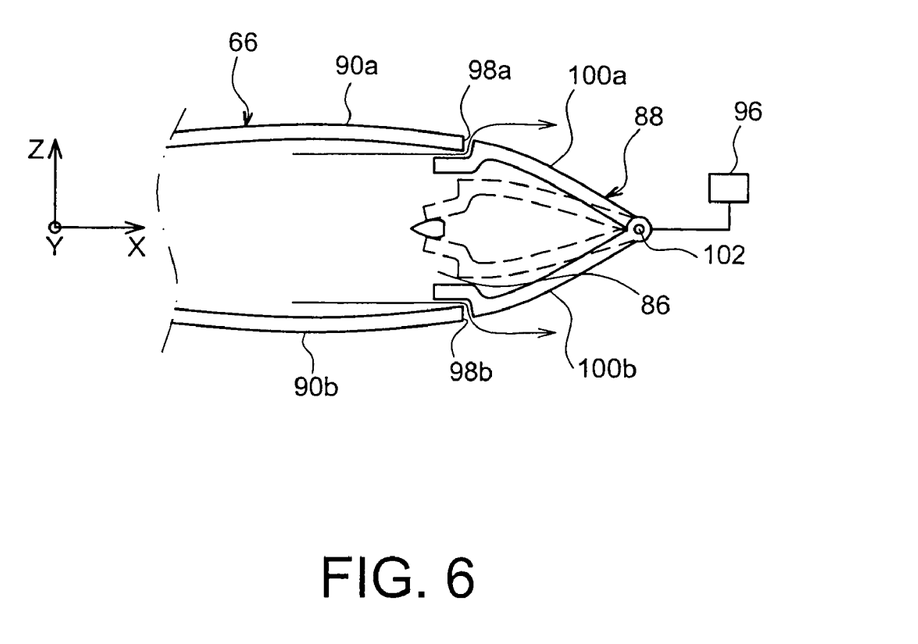
FIG. 6 shows a view similar to the views shown in FIGS. 5a and 5b, the controllable mobile structure being shown in an alternative form.

FIG. 6 shows a second way of making the aft portion of the aerodynamic fairing 66, also provided with an air outlet opening 86 in its aft end portion.

In this embodiment, it can be seen that the opening 86 is coupled to a mobile structure 88 that is no longer in the form of an ogive, but rather two panels 100a, 100b articulated with respect to each other at their aft end along an axis 102 preferably parallel to the Y direction, these panels 100a, 100b permanently projecting from the opening 86.

In the expanded position shown in solid lines, called the aerodynamic deployed position, the two panels 100a, 100b have a forward end bearing on the aft end of the skins 90a, 90b of the fairing 66, to be approximately along the aerodynamic extension of these skins. This structure 88, that is therefore controllable in rotation about axis 102, for example through actuation means 96 connected to it, can therefore be used to obtain an approximately continuous aerodynamic shaped fairing 66 with no offset, which generates low drag.

In the contracted position called the intake retracted position shown in dashed lines in FIG. 6, it can be seen that the two forward ends of panels 100a, 100b that are brought close together by pivoting are very far from the corresponding aft ends of the skins 90a, 90b, particularly implying that the opening 86 has a larger section, but especially that the aerodynamic extension of these lateral skins 90a and 90b of the fairing 66 is no longer assured. On the contrary, an offset or aerodynamic rupture 98a, 98b appears between the aft end of each of these two skins 90a, 90b and its associated panel 100a, 100b further back, which generates base drags caused by the air stream over the outer surface of these skins 90a, 90b.

One advantage related to use of the two alternatives that have just been described, is that advantage can be taken of a variable section opening 86 depending on the position of the mobile structure 88. Possible regulation of the air quantity output from the second outlet by varying the section of the fairing opening can eliminate the valve provided for this purpose that was previously placed on the upstream side on the exchanger system.

Figure 7A:
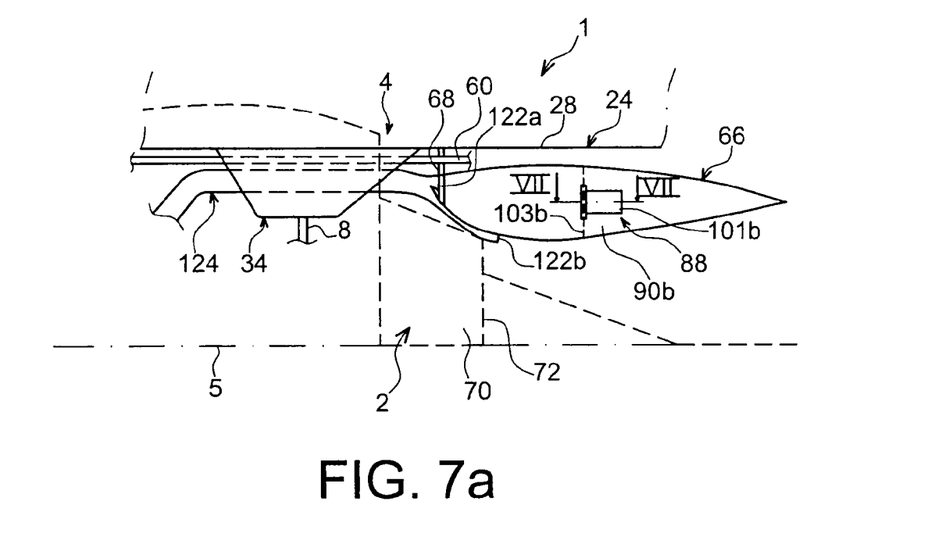
FIG. 7a shows a view similar to the view shown in FIG. 4, with an aft aerodynamic fairing equipped with a controllable mobile structure in another alternative embodiment.
Figure 7B:
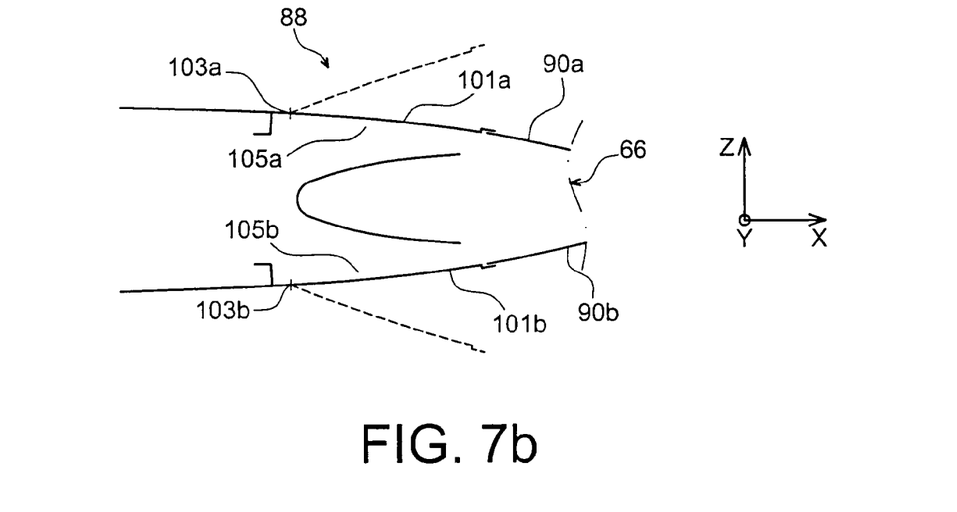

Now with reference to FIGS. 7a and 7b, the figures show a third way of extracting air from the aerodynamic fairing 66, without it being provided with an output opening in its aft end portion, but rather with two openings 105a, 105b located on each side of the fairing 66, on the two lateral skins 90a, 90b of this fairing. For guidance, these openings 105a, 105b may be located in or close to a central zone of the fairing 66, considered along the X direction.

In this embodiment, it can be seen that the mobile structure 88 is globally in the form of two lateral panels/flaps 101a, 101b, each articulated at its forward end on a lateral skin 90a, 90b of the fairing 66, and along the axes 103a and 103b preferably parallel to the Z direction.

In the folded down position shown in solid lines called the aerodynamic position, the two panels 101a, 101b have an aft end bearing in contact with the skins 90a, 90b of the fairing 66, so as to be located approximately along the aerodynamic extension of these skins. This structure 88, which is therefore controllable in rotation for example by actuation means (not shown) connected to it, can give an approximately continuous aerodynamic shaped fairing 66 without offset which generates a low drag. Therefore in this folded down position, each of the lateral panels 101a, 101b closes its associated opening 105a, 105b formed in the lateral skin 90a, 90b concerned of the fairing.

In the deployed position called the air exhaust position represented in dashed lines in FIG. 7b, it can be seen that the two aft ends of the panels 101a, 101b that have been expanded by pivoting along the axes 103a, 103b are moved away from the skins 90a, 90b respectively, implying in particular that the aerodynamic extension of these lateral skins 90a and 90b of the fairing 66 is no longer assured, but particularly that the air located in the fairing 66 can escape through the free spaces created between the skins 90a, 90b and the aft ends of the lateral panels 101a, 101b. The separation between the panels/lateral flaps 101a, 101b, which therefore releases openings 105a, 105b mentioned above, can naturally provoke an advantageous intake effect when they are deployed.

This panels/lateral flaps 101a, 101b solution is selected particularly when it is decided to use the two outlets 122a and 122b jointly as shown diagrammatically in FIG. 7a.

One adapted system (not shown) can then be used to prefer air exhaust either through the outlet 122a or through the outlet 122b, or through both of them simultaneously. In this respect, it should be noted that the outlet 122a will be used preferably in the case of a failure and for high flows (low aircraft speeds), while the outlet 122b will preferably be used in cruising or for low flows (high aircraft speeds).

Obviously, various modifications can be made by those skilled in the art to the aircraft engine assemblies 1 that have just been described, solely as non-limitative examples. In this respect, it is worth mentioning that although the pylon 4 has been presented in an adapted configuration for it to be suspended under the aircraft wing, this pylon 4 could also be presented in a different configuration so that it could be mounted above this wing.

Furthermore, the heat exchanger system used in this invention could be of any type other than air/air, namely fuel/air or oil/air without going outside the scope of the invention.

The invention claimed is:

1. An aircraft engine assembly comprising:
   an engine;
   an engine suspension pylon, the pylon comprising a rigid structure comprising a box and a mounting system inserted between the engine and the rigid structure, the mounting system comprising an aft engine suspension; and
   a heat exchanger system comprising an exchanger to which a hot fluid inlet, a cold air inlet, a first outlet communicating with the hot fluid inlet, and at least one second outlet communicating with the cold air inlet are connected, each second outlet from the heat exchanger system being located between the box and the engine;
   wherein each second outlet is located aft from the aft engine suspension; and
   wherein the rigid structure of the suspension pylon further comprises a structural block fixed on the box between the box and the engine, the structural block comprising an attachment interface of the aft engine suspension, the second outlet from the heat exchanger system being provided on a second outlet pipe connected to the exchanger and passing through the structural block.

2. An engine assembly according to claim 1, wherein the second outlet opens up at an outside wall of an aft aerodynamic fairing of the suspension pylon, the aft aerodynamic fairing being located entirely aft from the aft engine suspension.

3. An engine assembly according to claim 1, wherein the second outlet opens up inside an aft aerodynamic fairing of the suspension pylon, the aft aerodynamic fairing being located entirely aft from the aft engine suspension.

4. An engine assembly according to claim 3, wherein the aft aerodynamic fairing comprises an air outlet opening comprising a controllable mobile structure that, depending on its position, can modify an aerodynamic shape of fairing.

5. An engine assembly according to claim 4, wherein the mobile structure is placed across the air outlet opening.

6. An engine assembly according to claim 3, wherein the aft aerodynamic fairing comprises a controllable mobile structure comprising two lateral panels articulated at their forward ends on two corresponding lateral skins of the fairing, each of the panels configured to close/release an opening formed in its related lateral skin of the fairing.

7. An engine assembly according to claim 1, comprising first and second outlets, the first second outlet opening up at an outside wall of the aft aerodynamic fairing of the suspension pylon, the aft aerodynamic fairing being located entirely aft from the aft engine suspension, and the second outlet opening up inside the aft aerodynamic fairing of the suspension pylon.

8. An engine assembly according to claim 1, wherein the first outlet from the heat exchanger system is provided on a first outlet pipe connected to the exchanger and passing through the box of the rigid structure.

9. An engine assembly according to claim 1, wherein the first outlet is configured to be connected onto a wing element of an aircraft.

10. An engine assembly according to claim 1, wherein the exchanger is located between the box and the engine, forward from the aft suspension.

11. An engine assembly according to claim 1, wherein the heat exchanger system is of fluid/air type, the fluid passing through the hot fluid inlet and the first outlet and being chosen from among the group composed of air, oil, and fuel.

12. An engine assembly according to claim 1, wherein each second outlet is located between the box and the engine, adjacent to an engine exhaust nozzle or on a downstream side of the engine exhaust nozzle.

13. An aircraft comprising at least one engine assembly according to claim 1.

* * * * *